(12) United States Patent
Zhou et al.

(10) Patent No.: US 12,179,855 B2
(45) Date of Patent: Dec. 31, 2024

(54) SELF-POWER-ASSISTED-STEERING STEERING GEARBOX

(71) Applicant: Dongguan Excar Electric Vehicle Co., Ltd, Dongguan (CN)

(72) Inventors: Jianhui Zhou, Dongguan (CN); Runguang Zhou, Dongguan (CN); Bo Wu, Dongguan (CN)

(73) Assignee: Dongguan Excar Electric Vehicle Co., Ltd, Dongguan (CN)

( * ) Notice: Subject to any disclaimer, the term of this patent is extended or adjusted under 35 U.S.C. 154(b) by 0 days.

(21) Appl. No.: 18/644,767

(22) Filed: Apr. 24, 2024

(65) Prior Publication Data

US 2024/0359728 A1    Oct. 31, 2024

(30) Foreign Application Priority Data

Apr. 26, 2023  (CN) .......................... 202310461245.3

(51) Int. Cl.
  *B62D 5/04*    (2006.01)
(52) U.S. Cl.
  CPC ......... *B62D 5/0463* (2013.01); *B62D 5/0421* (2013.01); *B62D 5/0469* (2013.01); *B62D 5/0454* (2013.01)
(58) Field of Classification Search
  CPC .. B62D 5/0463; B62D 5/0421; B62D 5/0469; B62D 5/0454
  See application file for complete search history.

(56) References Cited

U.S. PATENT DOCUMENTS

| 10,239,552 | B2 * | 3/2019 | Bodtker | ................. | B62D 5/001 |
| 2020/0339182 | A1 * | 10/2020 | Harris | .................... | B62D 5/006 |
| 2022/0081026 | A1 * | 3/2022 | Weber | .................... | B62D 5/001 |
| 2022/0315095 | A1 * | 10/2022 | Heo | ........................ | B62D 5/001 |

FOREIGN PATENT DOCUMENTS

| CN | 102774416 A | 11/2012 |
| CN | 106627740 A | 5/2017 |
| CN | 107226129 A | 10/2017 |

* cited by examiner

*Primary Examiner* — Kevin Hurley
*Assistant Examiner* — Michael R Stabley

(57) ABSTRACT

Provided is a self-power-assisted-steering steering gearbox, including a steering gearbox body. The steering gearbox body is connected to a steering wheel and includes a pair of steering track rods arranged coaxially. The pair of steering track rods is connected on end portions close to each other through a steering rack. A shaft sleeve is sleeved outside the steering rack. The steering gearbox further includes a gear box, where a gear train is arranged in the gear box, and an axial direction of the gear train and an axial direction of the steering rack are obliquely arranged in a cross manner; a torque sensor; and a power-assisted motor, where a motor shaft of the power-assisted motor is partially arranged in the gear box in a penetrating manner, and an axis of the motor shaft and the axial direction of the gear train are obliquely arranged in a cross manner.

9 Claims, 6 Drawing Sheets

SELF-POWER-ASSISTED-STEERING STEERING GEARBOX

CROSS-REFERENCE TO RELATED APPLICATIONS

The application claims priority to Chinese patent application No. 202310461245.3, filed on Apr. 26, 2023, the entire contents of which are incorporated herein by reference.

TECHNICAL FIELD

The present invention belongs to the field of Golf Cart, All Terrain Vehicle (ATV) and Utility Vehicle (UTV) steering gearboxes and particularly relates to a self-power-assisted-steering steering gearbox.

BACKGROUND

A steering device, commonly known as a steering gearbox, is an important component of an vehicle drive system. It plays a role of amplifying a force applied by a driver to a steering wheel, so as to steer an vehicle.

The steering gearbox in the prior art often matches with a steering power-assisted mechanism, and the steering power-assisted mechanism is mounted on the steering column, which occupies much space at the lower end of the steering wheel, resulting in that the space of the vehicle is compressed in the vertical direction to a certain extent.

In view of this, it is an urgent need to provide a self-power-assisted-steering steering gearbox now to save the mounting space of the vehicle.

SUMMARY

Therefore, the present invention is to provide a self-power-assisted-steering steering gearbox now to save the mounting space of the golf cart, ATV and UTV.

The technical objective of the present invention is realized by the following technical solution:

A self-power-assisted-steering steering gearbox includes a steering gearbox body, the steering gearbox body being connected to a steering wheel, where the steering gearbox body includes a pair of steering track rods arranged coaxially, the pair of steering track rods is connected on end portions close to each other through a inner tie rod, and a protective bellow is sleeved outside the inner tie rod;

the steering gearbox further includes:

a gear box, where the gear box penetrates through the shaft sleeve, a gear train is arranged in the gear box, and an axial direction of the gear train and an axial direction of the steering rack are obliquely arranged in a cross manner;

a torque sensor, where the torque sensor has an input end and an output end, the input end thereof is arranged in the gear box and is configured to acquire torque data in the gear box, and the output end thereof is configured to output torque information collected at the input end; and a power-assisted motor, where a motor shaft of the power-assisted motor is partially arranged in the gear box in a penetrating manner, and an axis of the motor shaft and the axial direction of the gear train are obliquely arranged in a cross manner;

the gear train includes:

an input shaft arranged on an outer side of the gear box, where in response to a steering wheel, the input shaft receives a torque from the steering wheel and transfers the torque to the gear train;

a first output shaft arranged in the gear box and connected to the input shaft, where the first output shaft is coaxially connected to the input shaft, and the torque sensor is configured to acquire a torque of the first output shaft and to output the toque to the power-assisted motor;

a second input shaft coaxially connected to the first output shaft, where a first drive gear is sleeved outside the second input shaft, and the first drive gear is in meshing connection to the motor shaft;

the second input shaft is rotationally connected to the first output shaft and rotates coaxially with the first input shaft through a movable limiting mechanism;

the movable limiting mechanism, where the movable limiting mechanism is configured to limit a rotating angle of the second input shaft and has a dead point; when the rotating angle of the steering wheel is larger than a preset maximum torque, the second input shaft rotates with the first output shaft;

a second drive gear coaxially connected to the second input shaft, where the second drive gear is in meshing connection to the steering rack.

Further, the pair of steering track rods is connected to the end portions connected by the steering rack through spherical universal joints.

Further, a flexible folding sleeve is partially sleeved on a periphery of each of the steering track rods.

Further, both sides of the flexible folding sleeve are provided with openings and the flexible folding sleeve is fixedly connected to the steering track rod through a ribbon.

Further, at least one fixing seat is arranged on a side of the shaft sleeve away from a drive motor, and the fixing seat is configured to fix the steering gearbox body to a carrier.

Further, there are two fixed shafts symmetrically distributed about a center line of the shaft sleeve.

The present invention further provides a vehicle chassis, comprising the steering gearbox.

The present invention further provides a vehicle, comprising the steering gearbox.

Further, the vehicle includes an electric cart and an electric sightseeing vehicle.

Compared with the prior art, the technical solution of the present invention has the following advantages:

According to the self-power-assisted-steering steering gearbox provided by the present invention, the steering gearbox body and the gear box are arranged in the same cavity, then the gear train and the rack of the steering gearbox are also arranged in the same cavity, the motor is mounted on the cavity of the steering gearbox body and the gear box, and the sensor is fixed on the cavity of the steering gearbox body and the gear box. The sensor collects torques of the components in the gear train, the torque data is fed back to the motor, and the torque is controlled by the motor and is fed back to the steering track rod, so that steering of the track rod is achieved. Moreover, by this technical means, the mounting space is greatly saved.

1, gear box; 2, power-assisted motor; 3, torque sensor; 4, steering track rod; 5, motor shaft; 6, input shaft; 7, first output shaft; 8, second input shaft; 9, first drive gear; 10, second drive gear; 11, steering rack; 12, spherical universal joint; 13, folding sleeve; 14, ribbon; 15, fixing seat; 16, buffer adjustment part; 17, buffer spring; 18, clamping portion; 19, fixing sleeve; 20, movable limiting mechanism; 21, movable plate; 22, limiting plate; 23, housing of drive cavity; 24, rotating plate.

DETAILED DESCRIPTION OF THE EMBODIMENTS

The technical solution in the embodiments of the present invention will be clearly and completely described below in combination with the drawings in the embodiments of the present invention. Apparently, the embodiments described are merely some rather than all of the embodiments of the present invention. On the basis of the embodiments in the present invention, all other embodiments obtained by those of ordinary skill in the art without creative efforts fall into the scope of protection of the present invention.

Embodiment I

The embodiment provides a self-power-assisted-steering steering gearbox, including a steering gearbox body, the steering gearbox body being connected to a steering wheel. The steering gearbox includes a pair of steering track rods 4 arranged coaxially, the pair of steering track rods 4 is connected on end portions close to each other through a steering rack 11, and a shaft sleeve is sleeved outside the steering rack 11. The steering rack 11 reciprocates in a cavity formed in a length direction of the shaft sleeve.

Figure 1:
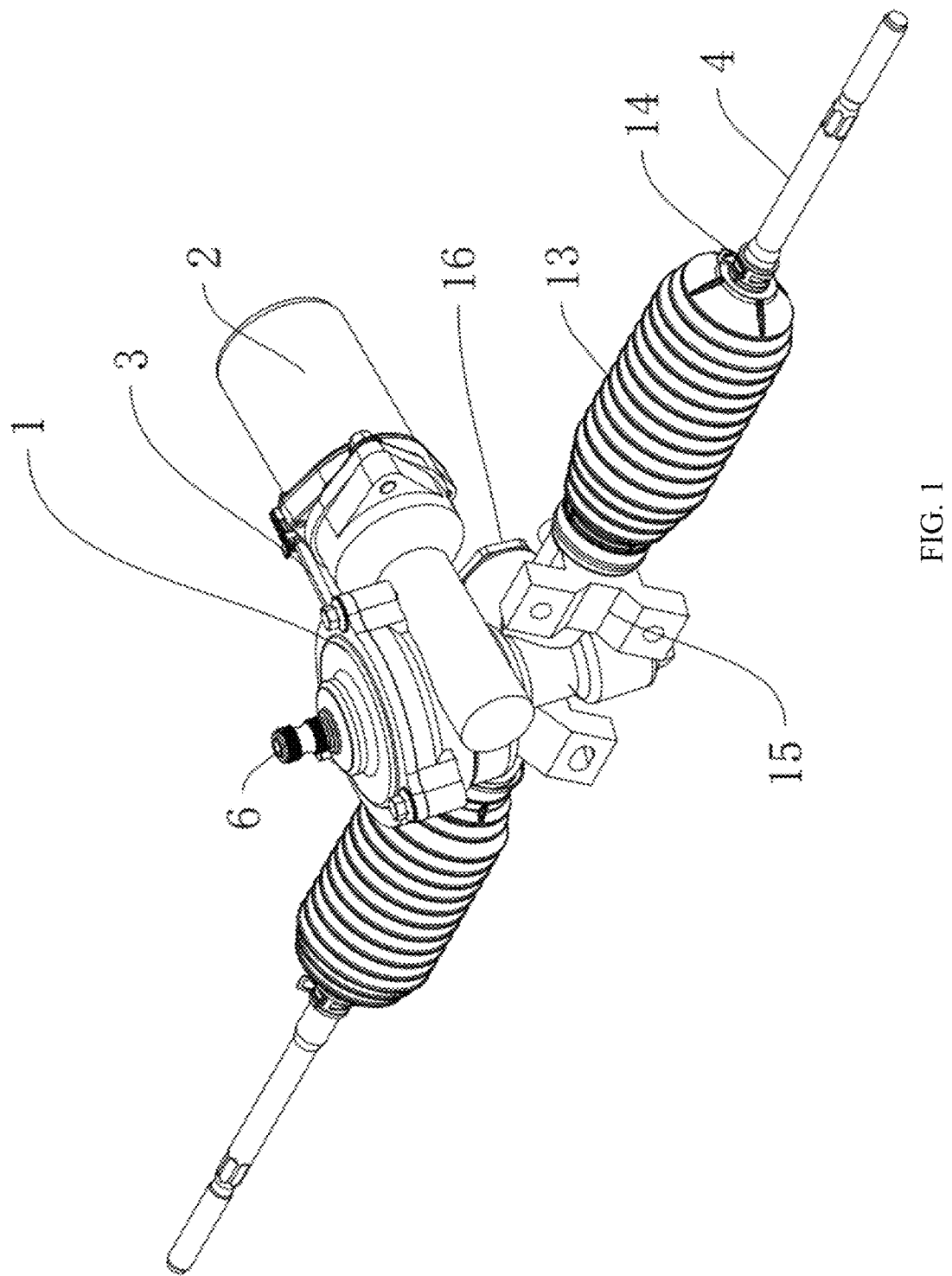
FIG. 1 is a schematic diagram of an overall structure of a steering gearbox provided in an embodiment of the present invention.
Figure 2:
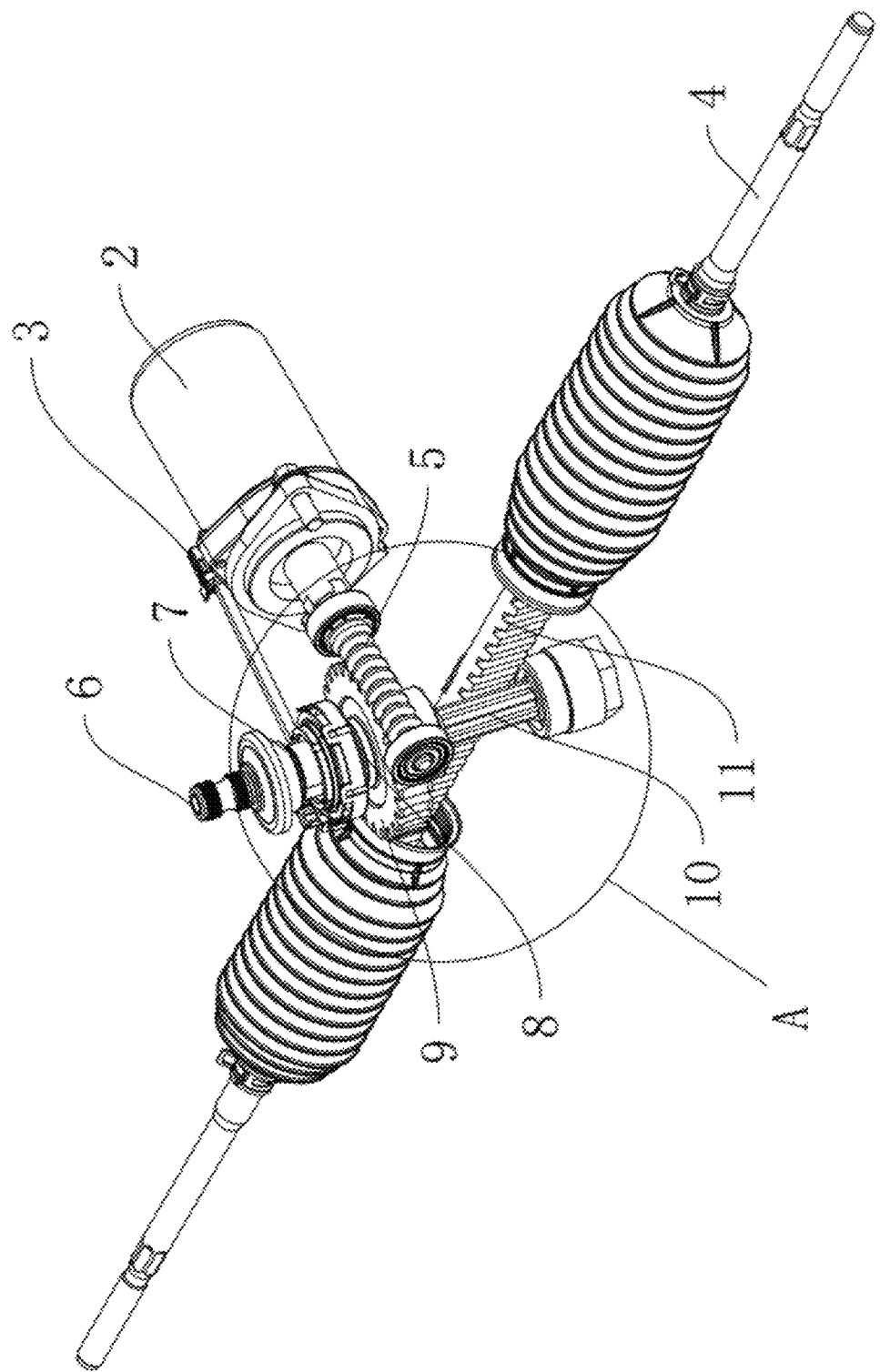
FIG. 2 is a schematic diagram of gear meshing of the steering gearbox provided in the embodiment of the present invention without a housing.
Figure 3:
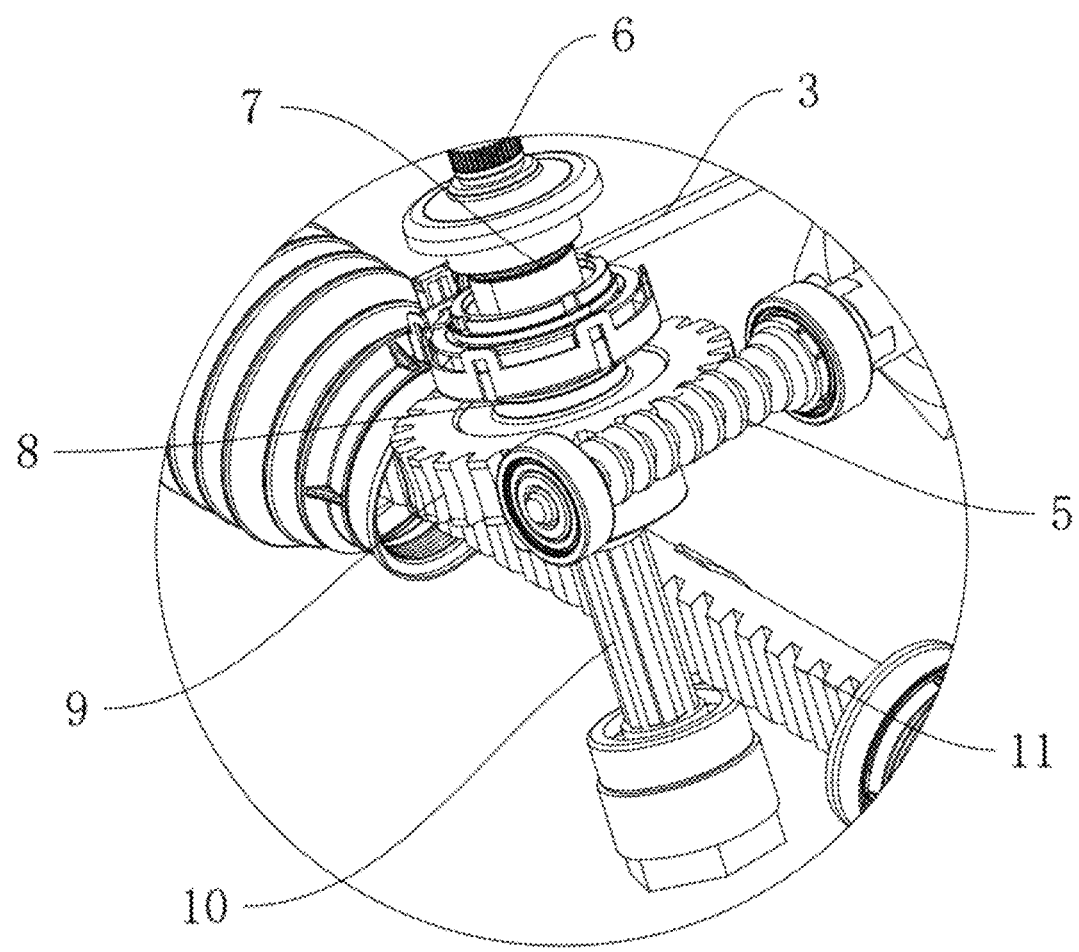
FIG. 3 is an enlarged diagram of A in FIG. 2 provided in the embodiment of the present invention.

The embodiment further includes a gear box 1, a torque sensor 3, a power-assisted motor 2, and a movable limiting mechanism 20, as shown in FIG. 1 and FIG. 2.

In the embodiment, the gear box 1 penetrates through the shaft sleeve, a gear train is arranged in the gear box 1, and an axial direction of the gear train and an axial direction of the steering rack 11 are obliquely arranged in a cross manner. In the embodiment, the cross oblique arrangement means that an included angle between the axial direction of the gear train and the length direction of the steering rack 11 on a co-projected plane is 0-90°, and the inclined arrangement is to save the space of mounting the power-assisted motor 2.

In the embodiment, a motor shaft 5 of the power-assisted motor 2 is partially arranged in the gear box 1 in a penetrating manner, and an axis of the motor shaft 5 and the axial direction of the gear train are obliquely arranged in a cross manner. The motor shaft 5 and the gear train have a meshing relationship. The motor shaft 5 matches with the gear train to amplify the torque from the steering wheel and execute a drive action to achieve power-assisting and steering functions.

Specifically, as shown in FIG. 2, in the embodiment, the gear train includes an input shaft 6, a first output shaft 7, a second input shaft 86, a first drive gear 9, and a second drive gear 10.

The input shaft 6 is located outside the gear box 1, the input shaft 6 is connected to the steering wheel, and in response to rotation of the steering wheel, receives the torque from the steering wheel and transfers the torque to other components in the gear train. The first output shaft 7 is arranged in the gear box 1 and is coaxially connected to the input shaft 6. The torque sensor 3 in the embodiment is configured to acquire the torque of the first output shaft 7 and to transmit the torque data to the power-assisted motor 2 through the output end. The power-assisted motor 2 outputs the amplified corresponding torque through the motor shaft 5. Specifically, the torque sensor 3 is arranged in a drive cavity between the first output shaft 7 and the second input shaft 86. The drive cavity includes a shell and a chamber.

The second input shaft 86 is coaxially connected to the first output shaft 7, a first drive gear 9 is sleeved outside the second input shaft 86, the first drive gear 9 is in meshing connection to the motor shaft 5, and the second drive gear 10 is coaxially connected to the second input shaft 86 and is in meshing connection to the steering rack 11.

As a further preferred mode of the embodiment, in the embodiment, the steering gearbox further include a movable limiting mechanism 20, where the movable limiting mechanism 20 is configured to limit a rotating angle of the second input shaft 86 and the movable limiting mechanism 20 has set a dead point; when the rotating angle of the steering wheel is larger than a preset maximum torque, the second input shaft 86 rotates with the first output shaft 7, and the dead point is monitored by the torque sensor 3.

Figure 5:
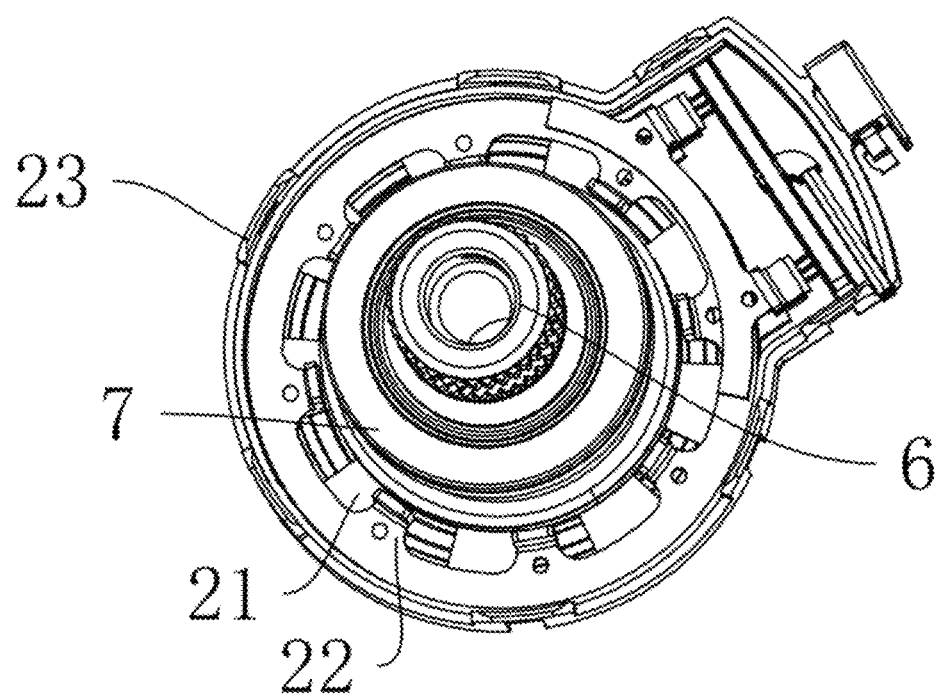
FIG. 5 is a structural schematic diagram of movable limiting mechanism provided in the embodiment of the present invention.
Figure 6:
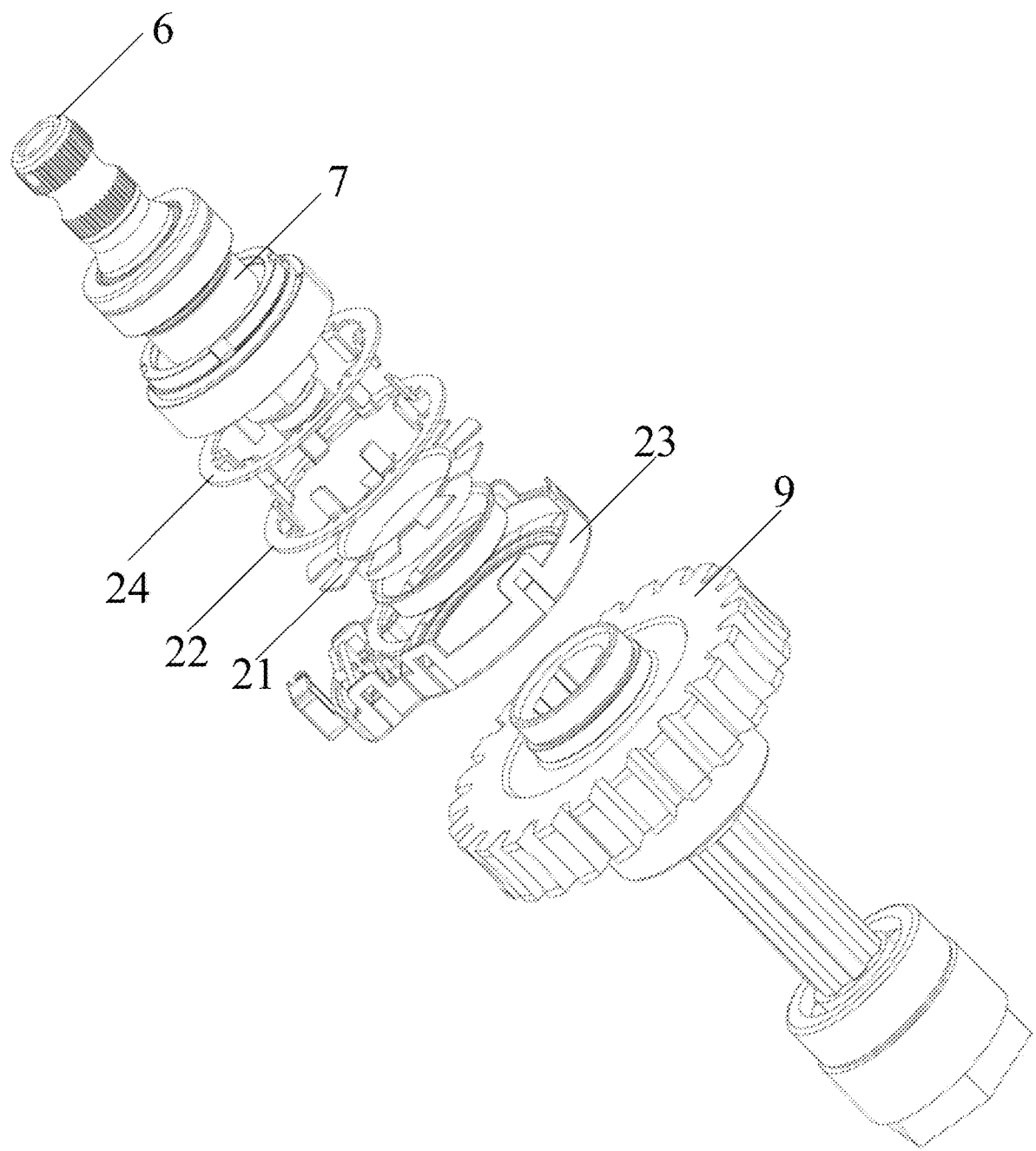
FIG. 6 is an exploded view of the movable limiting mechanism.

The movable limiting mechanism 20 is shown in FIG. 5 and FIG. 6. The movable limiting mechanism 20 and the torque sensor 3 are arranged in a same cavity and the movable limiting mechanism includes a movable plate 21 and a limiting plate 22; the movable plate 21 is connected to the first output shaft 7; the rotating plate 24 is connected to the second input shaft 86; when the movable plate 21 is located between the limiting plate 22 and a housing of a drive cavity 23, the movable plate 21 rotates with the first output shaft 7 and is not in direct drive connection to the second input shaft 86; the movable plate 21 is slidably arranged on a shaft body of the first output shaft 7 and moves in a shaft length direction of the first output shaft 7; a plurality of grooves are formed in the rotating plate 24; the size of each of the grooves corresponds to the size of the movable plate 21; and when the movable plate 21 moves to the groove and is as high as the limiting plate 22, a direct rotary connecting relationship is formed between the first output shaft 7 and the second input shaft 86.

In the embodiment, the movable plate 21 is controlled by a servo motor or a stepping motor to move on the first input shaft 6 and the vertical movement on the shaft body is executed by a servo motor control mechanism, which belong to common technical features in the art and are not repeatedly described herein.

As a further preferred mode of the embodiment, in the embodiment, the pair of steering track rods 4 is connected to the end portions connected by the steering rack 11 through spherical universal joints 12.

As a further preferred mode of the embodiment, in the embodiment, a flexible folding sleeve 13 is partially sleeved on a periphery of each of the steering track rods 4. The folding sleeve 13 stretches or is folded with movement of the steering track rods 4 to protect the steering track rods 4. In the embodiment, both sides of the flexible folding sleeve 13 are provided with openings and the flexible folding sleeve is fixedly connected to the steering track rod 4 through a ribbon 14.

As a further preferred mode of the embodiment, in the embodiment, at least one fixing seat 15 is arranged on a side of the shaft sleeve away from a drive motor, the fixing seat 15 is configured to fix the steering gearbox body to a carrier. In the embodiment, there are two fixed shafts symmetrically distributed about a center line of the shaft sleeve.

Figure 4:
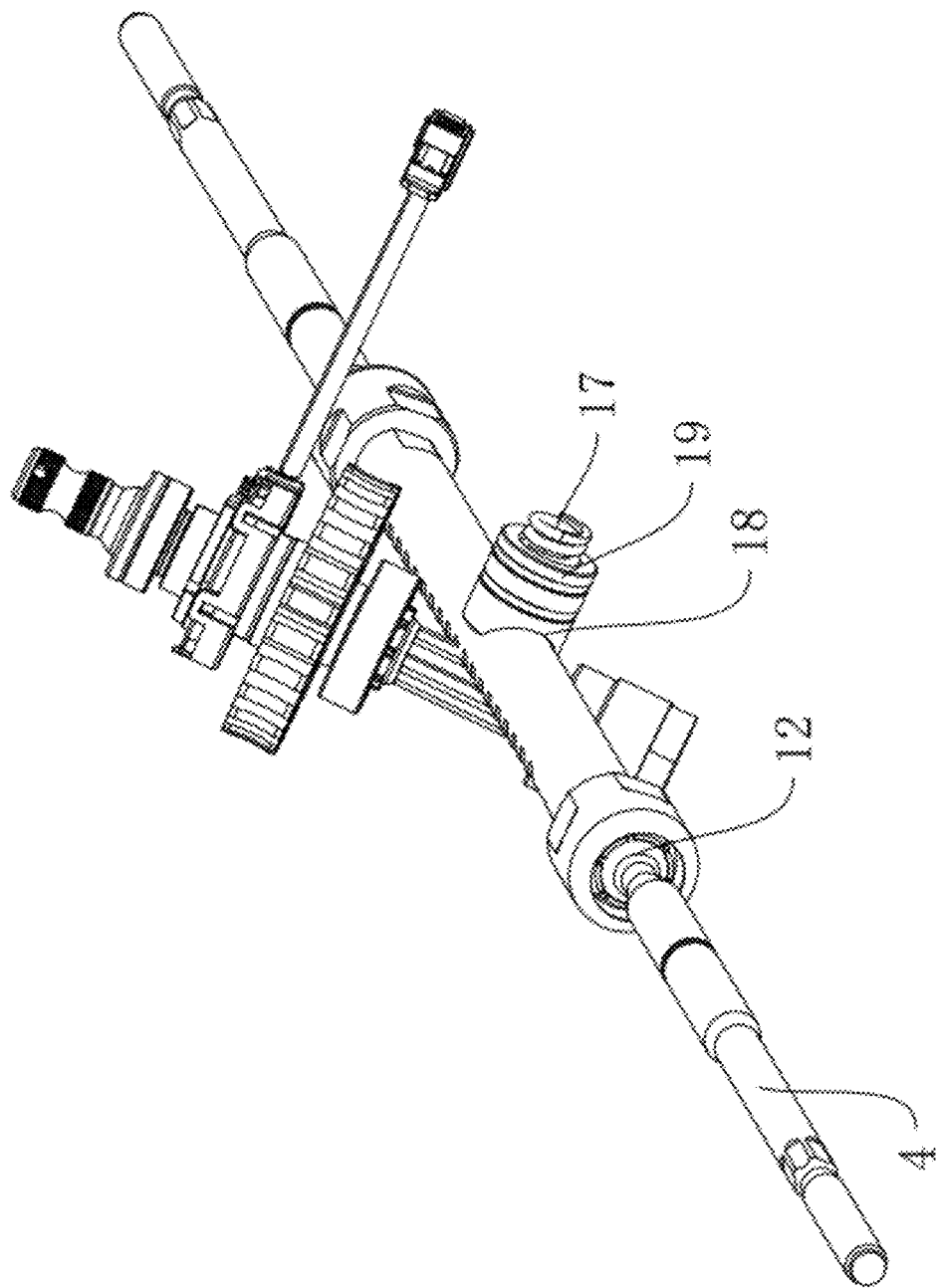
FIG. 4 is a schematic diagram of gear meshing of the steering gearbox provided in the embodiment of the present invention without the housing in another direction.

In the embodiment, the steering gearbox further includes a buffer adjustment part 16, as shown in FIG. 2 and FIG. 4, connected to the steering rack 11. The buffer adjustment part 16 is of a buffer spring structure and provides shock absorption and buffer in a direction perpendicular to the length direction of the steering rack 11.

Specifically, in the embodiment, the buffer adjustment piece 16 includes a fixing sleeve 19 and a buffer spring 17 arranged in a center cavity of the fixing sleeve 19. An end of the fixing sleeve 19 away from the buffer spring 17 is a clamping portion 18. The clamping portion 18 matches with the steering rack 11 in shape. The fixing sleeve 19 is connected to the shaft sleeve through bolts and provides shock absorption and buffer to a certain extent when the steering rack 11 moves in the direction perpendicular to the length direction of the steering rack.

Embodiment II

The embodiment provides a vehicle carrier, including the steering gearbox in the embodiment I.

Embodiment III

The embodiment provides a vehicle, including the steering gearbox in the embodiment I.

Apparently, the above-mentioned embodiments are merely examples made for describing the utility model clearly and are not to limit the implementation modes. Changes or variations in other different forms can be further made by those of ordinary skill in the art on a basis of the description. It is unnecessary to and unable to list all the implementation modes herein. Obvious modifications or variations made thereto shall still fall within the scope of the present invention.

What is claimed is:

1. A self-power-assisted-steering steering gearbox, comprising a steering gearbox body, the steering gearbox body being connected to a steering wheel, wherein
   the steering gearbox body comprises a pair of steering track rods arranged coaxially, the pair of steering track rods is connected on end portions close to each other through a steering rack, and a shaft sleeve is sleeved outside the steering rack;
   the steering gearbox further comprises:
   a gear box, wherein the gear box penetrates through the shaft sleeve, a gear train is arranged in the gear box, and an axial direction of the gear train and an axial direction of the steering rack are obliquely arranged in a cross manner;
   a torque sensor, wherein the torque sensor has an input end and an output end, the input end thereof is arranged in the gear box and is configured to acquire torque data in the gear box, and the output end thereof is configured to output torque information collected at the input end; and
   a power-assisted motor, wherein a motor shaft of the power-assisted motor is partially arranged in the gear box in a penetrating manner, and an axis of the motor shaft and the axial direction of the gear train are obliquely arranged in a cross manner;
   the gear train comprises:
   an input shaft arranged on an outer side of the gear box, wherein in response to a steering wheel, the input shaft receives a torque from the steering wheel and transfers the torque to the gear train;
   a first output shaft arranged in the gear box and connected to the input shaft, wherein the first output shaft is coaxially connected to the input shaft, and the torque sensor is configured to acquire a torque of the first output shaft and to output the torque to the power-assisted motor;
   a second input shaft coaxially connected to the first output shaft, wherein a first drive gear is sleeved outside the second input shaft, and the first drive gear is in meshing connection to the motor shaft;
   the second input shaft is rotationally connected to the first output shaft and rotates coaxially with the first input shaft through a movable limiting mechanism;
   wherein the movable limiting mechanism is configured to limit a rotating angle of the second input shaft and has a dead point; when a rotating angle of the steering wheel is larger than a preset maximum torque, the second input shaft rotates with the first output shaft; the movable limiting mechanism and the torque sensor are arranged in a same cavity, and the movable limiting mechanism comprises a movable plate and a limiting plate; the movable plate is connected to the first output shaft; a rotating plate is connected to the second input shaft; when the movable plate is located between the limiting plate and a housing of a drive cavity, the movable plate rotates with the first output shaft and is not in direct drive connection to the second input shaft; the movable plate is slidably arranged on a shaft body of the first output shaft and moves in a shaft length direction of the first output shaft; a plurality of grooves are formed in the rotating plate; the size of each of the grooves corresponds to the size of the movable plate; and when the movable plate moves to the groove and is as high as the limiting plate, a direct rotary connecting relationship is formed between the first output shaft and the second input shaft; and
   a second drive gear coaxially connected to the second input shaft, wherein the second drive gear is in meshing connection to the steering rack.

2. The self-power-assisted-steering steering gearbox according to claim 1, wherein the pair of steering track rods is connected to the end portions connected by the steering rack through spherical universal joints.

3. The self-power-assisted-steering steering gearbox according to claim 1, wherein a flexible folding sleeve is partially sleeved on a periphery of each of the steering track rods.

4. The self-power-assisted-steering steering gearbox according to claim 3, wherein both sides of the flexible folding sleeve are provided with openings and the flexible folding sleeve is fixedly connected to the steering track rod through a ribbon.

5. The self-power-assisted-steering steering gearbox according to claim 1, wherein at least one fixing seat is arranged on a side of the shaft sleeve away from a drive motor, and the fixing seat is configured to fix the steering gearbox body to a carrier.

6. The self-power-assisted-steering steering gearbox according to claim 5, wherein there are two fixed shafts symmetrically distributed about a center line of the shaft sleeve.

7. A vehicle chassis, comprising the steering gearbox according to claim 1.

8. A vehicle, comprising the steering gearbox according to claim 1.

9. The vehicle according to claim 8, comprising an electric cart and an electric sightseeing vehicle.

* * * * *